US012607501B2

(12) United States Patent　　　　　(10) Patent No.: US 12,607,501 B2
Zabawa　　　　　　　　　　　　　　(45) Date of Patent: Apr. 21, 2026

(54) CONDITIONING DEVICE FOR REDUCING POSITIONAL SENSITIVITY OF LASER BEAM ON PHOTODETECTOR AND METHOD OF USING THE SAME

(71) Applicant: ELECTRO SCIENTIFIC INDUSTRIES, INC., Beaverton, OR (US)

(72) Inventor: Patrick Zabawa, Beaverton, OR (US)

(73) Assignee: Electro Scientific Industries, Inc., Beverton, OR (US)

( * ) Notice: Subject to any disclaimer, the term of this patent is extended or adjusted under 35 U.S.C. 154(b) by 281 days.

(21) Appl. No.: 18/689,885

(22) PCT Filed: Aug. 12, 2022

(86) PCT No.: PCT/US2022/040159
§ 371 (c)(1),
(2) Date: Mar. 7, 2024

(87) PCT Pub. No.: WO2023/043551
PCT Pub. Date: Mar. 23, 2023

(65) Prior Publication Data
US 2025/0130101 A1　　Apr. 24, 2025

Related U.S. Application Data

(60) Provisional application No. 63/245,631, filed on Sep. 17, 2021.

(51) Int. Cl.
*G01J 1/04* (2006.01)
*G02B 1/04* (2006.01)
*G02B 5/02* (2006.01)
*G02B 27/28* (2006.01)

(52) U.S. Cl.
CPC .......... *G01J 1/0474* (2013.01); *G01J 1/0429* (2013.01); *G01J 1/0437* (2013.01); *G02B 1/04* (2013.01); *G02B 5/0278* (2013.01); *G02B 27/286* (2013.01)

(58) Field of Classification Search
CPC .................................................... G01J 1/0474
See application file for complete search history.

(56) References Cited

U.S. PATENT DOCUMENTS

| | | | |
|---|---|---|---|
| 7,554,737 B2 * | 6/2009 | Knox ................... | G02B 5/0252 |
| | | | 359/15 |
| 2008/0239317 A1 | 10/2008 | Schulkin et al. | |
| 2009/0052838 A1 * | 2/2009 | McDowall .......... | G02B 27/283 |
| | | | 385/18 |

(Continued)

FOREIGN PATENT DOCUMENTS

WO　　WO-2019109071 A1 * 6/2019 ......... G02B 27/0927

OTHER PUBLICATIONS

The Search Report issued for WO counterpart application No. PCT/US2022/040159 mailed Nov. 28, 2022 (5 pages).

(Continued)

*Primary Examiner* — Edwin C Gunberg
(74) *Attorney, Agent, or Firm* — Laurin T. Buettner

(57)　　　　ABSTRACT

In a system, a conditioning device includes a diffuser, a lens configured to focus a beam of laser energy onto the diffuser and an iris configured to transmit at least a portion of the beam of laser energy transmitted by the diffuser.

18 Claims, 1 Drawing Sheet

202: 208, 210, 212, 214, 216

(56) References Cited

U.S. PATENT DOCUMENTS

| | | | |
|---|---|---|---|
| 2010/0301024 A1 | 12/2010 | Unrath | |
| 2011/0310466 A1 | 12/2011 | McDowall et al. | |
| 2012/0168641 A1* | 7/2012 | Lizotte | C02F 1/325 |
| | | | 250/503.1 |
| 2020/0166690 A1* | 5/2020 | Rose | G02B 6/001 |
| 2022/0163786 A1* | 5/2022 | Hargis | B81B 3/0067 |

OTHER PUBLICATIONS

The Written Opinion issued for WO counterpart application No. PCT/US2022/040159 mailed Nov. 28, 2022 (5 pages).

Dr. Michael Schlipf / Martin Schuster, Designing With PTFE. Material, Design Criteria, Processing, System Solutions, Bibliothek Der Technik / Verlag Moderne Industrie, Dec. 2, 2013.

Processing Guide, Free flow granular PTFE, Information sheet for INOFLON, Jun. 9, 2015.

Benjamin TSAI et al. A Comparison of Optical Properties between High Density and Low Density Sintered PTFE. Proc. SPIE 7065, Reflection, Scattering, and Diffraction from Surfaces, 70650Y (Aug. 29, 2008).

Fluoropolymers Isostatically molded PTFE of highest quality, Application Note; Fluoropolymers, Information sheet, Jun. 8, 2016.

High-Reflectance PTFE Sheets, Information sheet from Thor Labs dated Apr. 20, 2021, accessible at https://web.archive.org/web/20210420193615/https://www.thorlabs.com/newgrouppage9.cfm?objectgroup_id=13871.

* cited by examiner

202: 208, 210, 212, 214, 216

CONDITIONING DEVICE FOR REDUCING POSITIONAL SENSITIVITY OF LASER BEAM ON PHOTODETECTOR AND METHOD OF USING THE SAME

CROSS-REFERENCE TO RELATED APPLICATIONS

This application claims the benefit of U.S. Provisional Application No. 63/245,631, filed Sep. 17, 2021, which is incorporated by reference in its entirety.

BACKGROUND

I. Technical Field

Embodiments of the present invention relate to techniques for reducing positional sensitivity of a high-intensity ultraviolet (UV) beam induced by a deflector on a photodetector. More particularly, embodiments of the present invention relate to a system for reducing the positional sensitivity using a lens with a polytetrafluoroethylene (PTFE) diffuser.

II. Discussion of the Related Art

Accurate measurement of laser energy is critical for active power control in laser processing systems, such as laser processing systems designed to drill vias in printed circuit boards (PCBs). In such a laser processing system, and with reference to FIG. 1, laser energy (in the form of one or more laser pulses) is commonly measured by placing a beam splitter (e.g., a partially-reflecting mirror 102, as shown in FIG. 1) in a beam path 116 along which the laser energy propagates. A majority of the laser energy is directed by the beam splitter along a primary beam path 104a (e.g., to a scan head of the laser processing system) and the remainder of the laser energy is directed along a secondary beam path 104b to the photodetector 106 (specifically, to an optical input 106a of the photodetector 106). In this way, laser energy directed to the scan head can be used to process a workpiece (e.g., a PCB) while laser energy is measured at the photodetector 106. Signals generated by the photodetector 106, in response to laser energy incident upon the optical input 106a of the photodetector 106, can be transmitted to a device such as a controller, where they can be processed to support various functions such as real-time pulse energy control (e.g., to compensate for changes in laser power), system calibrations, and the like.

It is also common for laser processing systems to change the position of the beam axis along which the beam of laser energy propagates during processing of a workpiece (e.g., using a beam deflector such as an acousto-optical deflector (AOD), a galvanometer mirror, or the like or any combination thereof), thereby scanning or otherwise deflecting the beam path 104. If the beam path 104 is deflected, then the primary beam path 104a and secondary beam path 104b will also be deflected. If the secondary beam path 104b is deflected, then the position at which laser energy propagating along the secondary beam path 104b is incident upon the optical input 106a of the photodetector 106 will change.

However, measurements made at the photodetector 106 typically vary depending upon the position or angle of the laser energy incident thereto. Thus, movement of laser energy incident upon the optical input 106a of the photodetector 106 can cause a measurement error, which can result in erroneous power control, system calibrations, etc. Several solutions have been implemented to minimize this effect, including the use of conditioning devices such as integrating spheres and transmissive alumina diffusers. However, after much investigation, the inventor has found that the optical output of these devices changes over time (a phenomenon hereby referred to as "throughput transience") when the laser energy has a wavelength in the ultraviolet (UV) range of the electromagnetic spectrum. Throughput transience undesirably causes the laser processing system to deliver the incorrect power to the workpiece. The root cause of this throughput transience may vary depending on the type of conditioning device used, as UV light is readily absorbed by many materials and contaminants.

For example, a beam of UV laser energy can either directly break down coating material on the interior of an integrating sphere and/or can act to clean it. This has been discovered to be a problem even when the interior coating material is PTFE, as such PTFE coatings are porous sintered materials (involving heating and compression of resinous material, without melting) that are susceptible contamination by volatile organic compounds (VOCs). The optical output of an integrating sphere with such a porous PTFE coating can change significantly, even for small changes in surface reflectance of the coating material, because photons in the beam of laser energy typically undergo multiple reflections before exiting the integrating sphere. The optical output of the integrating sphere may stabilize over time (typically only after hours to days of exposure to UV light), but the problem can recur due to re-contamination.

Bulk transmissive diffusers do not rely on multiple reflections like integrating spheres, but can still exhibit throughput transience upon exposure to UV light due to changes in either the surface or bulk transmission. Long-lived fluorescence may also be present, depending on the material from which the diffuser is formed, though the fluorescence signal can be removed with an appropriate filter. These effects are also magnified as the intensity of the laser energy increases. Using spaced, stacked bulk transmissive diffusers is a potential alternative to focusing with a lens, but this design has other disadvantages (lacking compactness, positional sensitivity).

SUMMARY

One embodiment can be generally characterized as a conditioning device that includes a diffuser, a lens configured to focus a beam of laser energy onto the diffuser and an iris configured to transmit at least a portion of the beam of laser energy transmitted by the diffuser.

Another embodiment can be generally characterized as a method that includes focusing a beam of laser energy having a wavelength in the ultra-violet (UV) range of the electromagnetic spectrum, diffusing the focused beam of laser energy and propagating at least a portion of the diffused beam of laser energy through an aperture and onto a photodetector.

DETAILED DESCRIPTION

Figure 1:
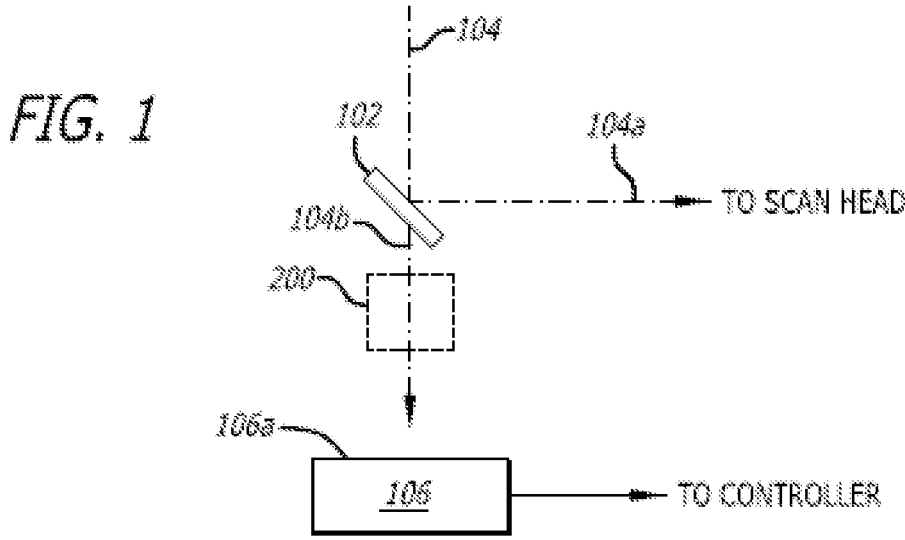
FIG. 1 is a schematic view illustrating a beam path involving a photodetector.

Example embodiments are described herein with reference to the accompanying FIGS. Unless otherwise expressly stated, in the drawings the sizes, positions, etc., of components, features, elements, etc., as well as any distances therebetween, are not necessarily to scale, but are exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa. The section headings used herein are for organizational purposes only and are not to be construed as limiting the subject matter described.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

It will be appreciated that many different forms and embodiments are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

A conditioning device according to embodiments of the present invention can be arranged optically-upstream of the optical input 106a of the photodetector 106 to overcome problems and disadvantages associated with the conventional conditioning devices described above. The conditioning device, shown in FIG. 1 at 200, can be arranged between in the secondary beam path 104b, between the beam splitter (i.e., the partially-reflecting mirror 102 shown in FIG. 1) and the optical input 106a of the photodetector 106. Thus, the conditioning device 200 can receive laser energy propagating along the secondary beam path 104b and, as will be described in greater detail below, modify or otherwise condition it. The conditioned laser energy is output from conditioning device 200 such that it propagates to the optical input 106a of the photodetector 106. Although the beam splitter is described as being provided as a partially-reflecting mirror 102, it will be appreciated that the beam splitter may be provided as one or more other components, such as a beam splitting cube, or the like or any combination thereof.

Although not shown in FIG. 1, a beam deflector such as an AOD, a galvanometer mirror, or the like or any combination thereof, can be provided optically upstream of the beam splitter 102 to scan or otherwise deflect the beam path 104 (e.g., relative to the beam splitter 102). If the beam path 104 is deflected, then the primary beam path 104a and secondary beam path 104b will also be deflected. If the secondary beam path 104b is deflected, then the position at which laser energy propagating along the secondary beam path 104b is incident upon the optical input 106a of the photodetector 106 will change.

Additionally, and although not shown in FIG. 1, a laser source can be provided to generate the beam of laser energy which is to propagate along beam path 104. According to embodiments exemplarily described herein, the beam of laser energy has one or more wavelengths in the ultra-violet (UV) range of the electromagnetic spectrum and is manifested as series of laser pulses having characteristics such as pulse duration, pulse repetition rate, pulse energy, etc., which render the laser pulses suitable to process (e.g., heat, melt, vaporize, ablate, etc.) a workpiece such as a printed circuit board, integrated circuit substrate, etc. (e.g., to form vias therein).

Figure 2:
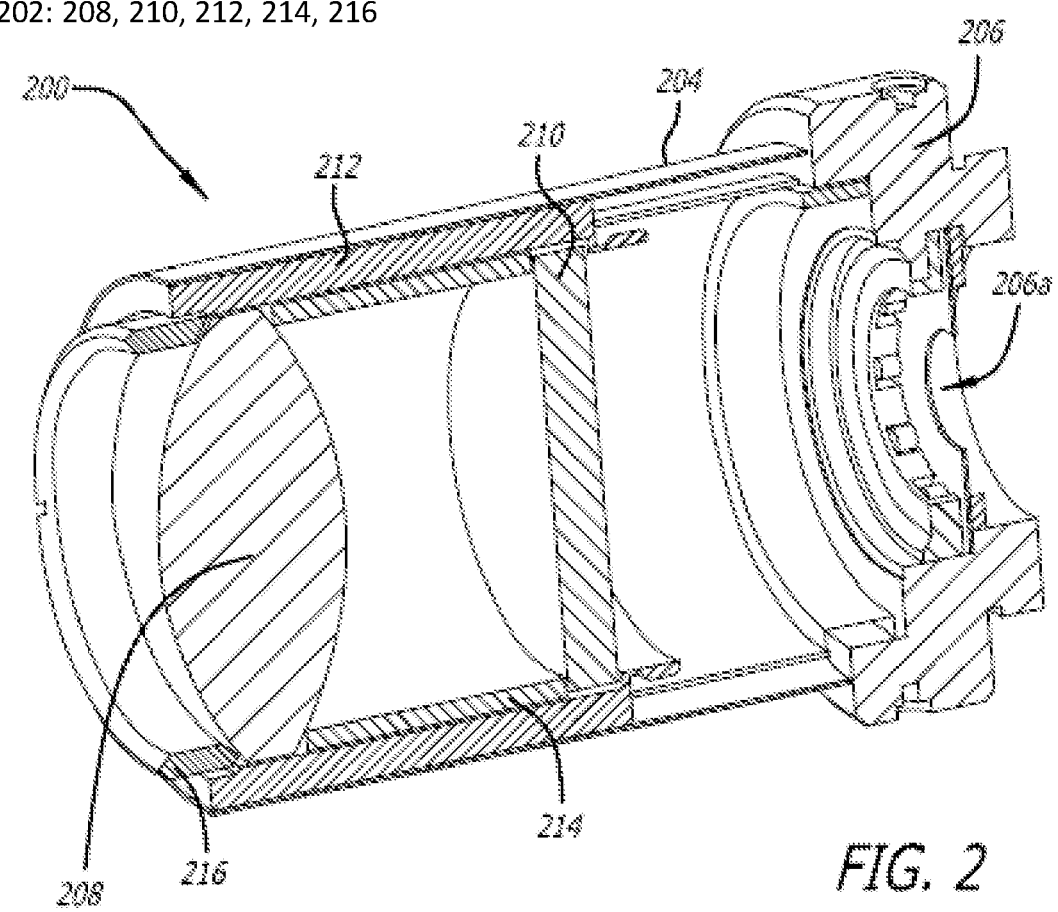
FIG. 2 is a perspective, cross-sectional view illustrating a conditioning device according to some embodiments of the present invention, which may be placed in the beam path shown in FIG. 1.

Referring to FIG. 2, the conditioning device 200 can include an optic cell 202, a spacer 204, and an iris diaphragm assembly 206. The optic cell 202 can include lens 208, a diffuser 210, a lens mount 212, a lens spacer 214 and a lens ring 216. As illustrated, optical axes of the lens 208, diffuser 210 and iris diaphragm assembly 206 are colinear, i.e., these components share the same optical axis (herein referred to as the "optical axis of the conditioning device 200"). The optical axis of the conditioning device 200 may be aligned to a "center" position of the beam path 104 (i.e., a position of the beam path 104 in which laser energy propagating through the scan head to irradiates a workpiece at a center of the scan field projected onto the workpiece).

In one embodiment, the conditioning device 200 can be assembled by first attaching the lens mount 212 to the spacer 204 (e.g., by screwing a first end of the lens mount 212 into a first end of the spacer 204, or vice-versa), inserting the diffuser 210 into the lens mount 212 (e.g., through a second end of the lens mount 212 opposite the first end thereof, such that the diffuser 210 abuts a flange at the first end of the lens mount 212), inserting the lens spacer 214 into the lens mount 212 (e.g., through the second end of the lens mount 212 such that the lens spacer 214 abuts the diffuser 210), inserting the lens 208 into the lens mount 212 (e.g., through the second end of the lens mount 212 such that the lens 208 abuts the lens spacer 214), attaching the lens ring 216 to the second end of the lens mount 212 (e.g., by screwing the lens ring 216 into the second end of the lens mount 212, or vice-versa), and then attaching the iris diaphragm assembly 206 to a second end of the spacer 204 (e.g., by screwing the second end of the spacer 204 into an end of the iris diaphragm assembly 206, or vice-versa). It will be appreciated that the conditioning device 200 may be assembled in any other desired or suitable manner, and that the conditioning device 200 may include more, fewer or different components than described herein.

The lens 208 is configured to focus an incident beam of laser energy (e.g., a beam of laser energy having a wavelength in the UV range of the electromagnetic spectrum, also herein referred to simply as a "UV laser energy"). In this case, the diffuser 210 is not located at the focal point of the lens 208; for example, the surface of the diffuser 210 facing the lens 208 can be located optically-upstream of the focal point or optically-downstream of the focal point. Placing the surface of the diffuser 210 facing the lens 208 directly at the focal point of the lens 208 may cause unwanted issues (e.g., averaging over a smaller surface area, higher laser intensity, etc.). Nevertheless, in some embodiments (e.g., in which the lens 208 is relatively weak, so as to produce a relatively large focal spot, or the like), the surface of the diffuser 210 facing the lens 208 can be directly at the focal point of the lens 208. By focusing the beam of laser energy, movement of the beam of laser energy at the diffuser 210 due to deflection of the beam path 104 can be reduced or minimized. As shown, the lens 208 is a converging lens, such as a biconvex lens.

The diffuser 210 is configured to diffuse the incident, focused beam of UV laser energy. According to embodiments disclosed herein, the diffuser 210 is formed from a membrane of non-porous PTFE material (also known in the art as high-density PTFE). The non-porous PTFE membrane is an isostatically molded material (involving melting and compression of resinous material, as known in the art), which can be skived, extruded, cut, etc., as necessary to make a diffuser having necessary or desired dimensions (generally, the front and back surfaces of the diffuser 210 are at least substantially planar). At the same thickness, a membrane formed of non-porous PTFE material has been found by the inventor to transmit more UV laser energy than a membrane formed of porous PTFE material. The inventor has determined that the choice of non-porous PTFE material is critical for achieving a stable optical output over time (i.e., minimal throughput transience) in the presence of a high intensity beam of UV laser energy.

Key properties for the selection of a non-porous PTFE material suitable (or any material other than non-porous PTFE) for use as the diffuser 210 include: should exhibit Lambertian scattering; be hydrophobic (resistant to humidity, exhibit essentially no water absorption or wetting); be resistant to contaminants; be easy to clean; be chemically inert (exhibit essentially no change in surface or bulk properties over time in a system environment which undergoes changes in temperature and humidity); exhibit extremely low UV absorption, with linear response vs. input optical power; exhibit high damage threshold for UV laser energy (e.g., 355 nm) at fluence levels typically encountered; and exhibit low transmittance (e.g., 10%-20%, or thereabout) to provide for desired attenuation and diffusion). It is also highly desirable that the diffuser material exhibit no fluorescence in presence of UV laser energy (e.g., 355 nm), to obviate need for a color filter. Fluorescence is to be avoided as it is indicative of absorption and because it is typically a long-lived phenomenon which would negatively impact the rise/fall time of output signals generated by the photodetector 106.

An example of a suitably high damage threshold for laser energy at 355 nm (e.g., manifested as laser pulses having a pulse duration in a range from 5 ns to 35 ns) is in a range from 0.2 J/cm$^2$ (or thereabout) to 0.1 J/cm$^2$ (or thereabout), though it should be appreciated that the particular damage threshold value can change based on the particular use case.

It should be appreciated by those of ordinary skill in the art that transmittance of the diffuser material will depend on the thickness thereof, and sometimes the wavelength of the laser energy to be diffused thereby. Further, transmittance can generally correspond to the inverse of the effective optical density (OD) of the diffuser material per unit mm thickness of the diffuser material. In this case, the diffuser material can have an OD/mm of 0.3 or thereabout. It should be appreciated that an OD/mm higher than 0.3 is acceptable as long as the diffuser material can suitably reflect and scatter the laser energy.

Given the optical characteristics described above, it will be appreciated that the diffuser 210 is not formed of alumina, fused silica, white glass, polypropylene, cellulose triacetate (TAC), or the like.

The spacer 204 allows for the diffused beam of UV laser energy transmitted by the diffuser 210 to propagate some distance before reaching an aperture 206a of the iris diaphragm assembly 206.

The iris diaphragm assembly 202 defines an aperture 206a, through which the diffused beam of UV laser energy can propagate. UV laser energy propagating through the aperture 206a can thereafter propagate along the secondary beam path 104b to optical input 106a of the photodetector 106.

It should be noted that there is a small but noticeable sensitivity to input laser polarization angle (assumed to be linear) with the conditioning device 200 constructed as described above. This is caused by variation in the angle of incidence because a beam deflector (e.g., an AOD) is operated to deflect the beam path 104, can be described by the Fresnel equations. This sensitivity is largest when the beam of laser energy (with no deflection) is misaligned relative to the optical axis of the conditioning device 200 and the beam path 104 is scanned along a direction parallel to the polarization axis beam of laser energy. If the polarization axis of the beam of laser energy incident upon the diffuser 210 is orthogonal to the plane of incidence at the diffuser 210, then the transmission of diffuser 210 will decrease at larger angles of incidence. In contrast, if the polarization is parallel to the plane of incidence at the diffuser 210, then the transmission of diffuser 210, then the transmission will increase for larger angles of incidence. In practice, the latter case tends to balance out other sources of sensitivity which cause the transmitted optical energy to decrease at larger angles of incidence, while the former tends to add to it. A potential modification to the design is the addition of a λ/4 waveplate located optically-upstream of the diffuser 210 to convert the linear polarization of the laser energy to circular polarization. This should roughly balance out the polarization sensitivity for any combination of misalignment and scan angle. The length of the spacer 204 can also be set to reduce angular or misalignment sensitivity.

Notwithstanding the discussion above concerning the material of the diffuser 210, it should be recognized that the diffuser 210 may be formed of a membrane of porous PTFE material if the ability to clean, susceptibility to contamination and variations in transmission vs. position/angle are not of concern.

Although the conditioning device 200 has been described for use with UV laser energy, it will be appreciated that the design of the conditioning device 200 can be modified in any desired or suitable manner (e.g., by appropriate choice of material for the lens 208) for use with laser energy having wavelengths in the visible, near-infrared (IR) and/or mid-IR ranges of the electromagnetic spectrum. It should also be noted that PTFE material is also suitable for use as a material for the diffuser 210 for laser energy at wavelengths as short as ~250 nm (absorption and accelerated degradation of the diffuser 210 is likely at wavelengths shorter than ~250 nm).

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A system, comprising:
a conditioning device including:
a diffuser;
a lens configured to focus a beam of laser energy onto the diffuser; and
an iris configured to transmit at least a portion of the beam of laser energy transmitted by the diffuser.

2. The system of claim 1, wherein the conditioning device further includes a waveplate arranged between the diffuser and the lens.

3. The system of claim 2, wherein the waveplate is a quarter waveplate.

4. The system of claim 1, further comprising a photodetector having an optical input arranged to receive the beam of laser energy output from the conditioning device.

5. The system of claim 1, further comprising a deflector operative to deflect the beam of laser energy and arranged optically upstream of the conditioning device.

6. The system of claim 1, wherein the diffuser is formed of non-porous PTFE.

7. The system of claim 1, wherein the diffuser is formed of porous PTFE.

8. The system of claim 1, wherein the diffuser is not formed of porous PTFE, alumina, fused silica, white glass, polypropylene or cellulose triacetate (TAC).

9. The system of claim 1, wherein the diffuser is formed of a material that exhibits no fluorescence in presence of laser energy having a wavelength in the ultra-violet (UV) range of the electromagnetic spectrum.

10. The system of claim 1, wherein the conditioning device does not include a color filter.

11. A method, comprising:
focusing a beam of laser energy having a wavelength in the ultra-violet (UV) range of the electromagnetic spectrum;
diffusing the focused beam of laser energy; and
propagating at least a portion of the diffused beam of laser energy through an aperture and onto a photodetector.

12. The method of claim 11, further comprising propagating the focused beam of laser energy through a waveplate before diffusing the focused beam of laser energy.

13. The method of claim 12, wherein the waveplate is a quarter waveplate.

14. The method of claim 11, further comprising deflecting the beam of laser energy, wherein focusing the beam of laser energy includes focusing the deflected beam of laser energy.

15. The method of claim 11, wherein diffusing the beam of laser energy includes diffusing the beam of laser energy using a diffuser formed of non-porous PTFE.

16. The method of claim 11, wherein diffusing the beam of laser energy includes diffusing the beam of laser energy using a diffuser formed of porous PTFE.

17. The method of claim 11, wherein diffusing the beam of laser energy includes diffusing the beam of laser energy using a diffuser that is not formed of porous PTFE, alumina, fused silica, white glass, polypropylene or cellulose triacetate (TAC).

18. The method of claim 11, wherein diffusing the beam of laser energy includes diffusing the beam of laser energy using a diffuser formed of a material that exhibits no fluorescence in presence of laser energy having a wavelength in the UV range of the electromagnetic spectrum.

* * * * *